252-589 $$$ SR CROSS REFERENCE SEARCH ROOM
MTR34 OR T 856,006
1968

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 5, 1968

856 O.G. 4

T 856 006

~~594,371~~

TOLYLENE DIISOCYANATE COMPOSITIONS STABILIZED AGAINST LIGHT DISCOLORATION

John R. Cooper, Hockessin, and William C. Percival, Wilmington, Del., assignors to E. I. du Pont de Nemours and Company, Wilmington, Del., a corporation of Delaware

Filed Nov. 15, 1966. Published Nov. 5, 1968
Class 260—453
No Drawing. 10 Pages Specification

2-4-tolylene diisocyanate, 2-6-tolylene diisocyanate and mixtures thereof are stabilized against discoloration from exposure to light by dissolving therein about 0.005–0.5% by weight of 2,6-di-tertiary-butyl-4-methylphenol and about 0.005–0.5% by weight of at least one ultraviolet light absorber from the group (a) 2-hydroxybenzophenone, (b) 2-(2-hydroxyphenyl)-benzotriazole, (c) amides of 2-(2-aminophenyl)-benzotriazole and (d) substituted derivatives of (a), (b) and (c) in which at least one hydrogen on the carbocyclic rings present in (a), (b) and (c) is replaced with at least one of the groups; alkyl, halo, alkoxy or hydroxy. In preferred compositions, the 2,6-di-tertiary-butyl-4-methylphenol and ultraviolet light absorber are each present in the amount of 0.01–0.10% by weight. Derivatives of 2-(2-hydroxyphenyl)-benzotriazole, and in particular 2-(2-hydroxy-5-methylphenyl)-benzotriazole and 2-(2-hydroxy-3-tertiary-butyl-5-methylphenyl) - 7 - chlorobenzotriazole, are preferred ultraviolet light absorbers.